United States Patent
O'Brien

(10) Patent No.: US 11,638,974 B2
(45) Date of Patent: May 2, 2023

(54) BOILER TUBE PANEL INSTALLATION DEVICE AND METHOD OF ALIGNING

(71) Applicant: Consolidated Edison Company of New York, Inc., New York, NY (US)

(72) Inventor: Mark O'Brien, Tuckahoe, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 496 days.

(21) Appl. No.: 16/790,073

(22) Filed: Feb. 13, 2020

(65) Prior Publication Data
US 2021/0252649 A1 Aug. 19, 2021

(51) Int. Cl.
| | | |
|---|---|---|
| B23K 37/053 | (2006.01) | |
| B23P 6/00 | (2006.01) | |
| B23P 19/12 | (2006.01) | |
| B21D 53/06 | (2006.01) | |
| B23K 31/02 | (2006.01) | |
| B23P 19/10 | (2006.01) | |
| B23K 101/04 | (2006.01) | |
| B21D 53/08 | (2006.01) | |
| B21D 39/04 | (2006.01) | |

(52) U.S. Cl.
CPC .......... *B23K 37/053* (2013.01); *B23K 31/027* (2013.01); *B23P 6/00* (2013.01); *B23P 19/10* (2013.01); *B21D 39/046* (2013.01); *B21D 53/06* (2013.01); *B21D 53/08* (2013.01); *B23K 2101/04* (2018.08); *B23P 19/12* (2013.01)

(58) Field of Classification Search
CPC .............. B23K 37/0531; B23K 37/053; B23K 2101/14; B23P 15/26; B23P 19/12; B23P 6/00; B21D 53/06; B21D 53/08; B21D 39/04; B21D 39/046
See application file for complete search history.

(56) References Cited

U.S. PATENT DOCUMENTS

| | | |
|---|---|---|
| 5,146,878 A | 9/1992 | Hulkkonen |
| 5,705,134 A | 1/1998 | Biagi |
| 6,041,854 A | 3/2000 | Fox |
| 6,481,918 B2 | 11/2002 | Remmick |
| 6,742,958 B2 | 6/2004 | Remmick |
| 7,681,421 B2 | 3/2010 | Cannon |
| 9,347,686 B2 | 5/2016 | Waysluk et al. |
| 2013/0118480 A1 | 5/2013 | Kraft et al. |

FOREIGN PATENT DOCUMENTS

| | | | | |
|---|---|---|---|---|
| EP | 2405224 A1 * | 1/2012 | ......... | B21C 37/0815 |
| JP | H09108760 A * | 9/1997 | ......... | B21C 37/0815 |

OTHER PUBLICATIONS

Machine Translation of JP-H09108760-A (Year: 1997).*

* cited by examiner

Primary Examiner — Christopher J Besler
(74) Attorney, Agent, or Firm — Cantor Colburn LLP

(57) ABSTRACT

An alignment device for aligning a tube panel with a plurality of pipes system and a method of performing the alignment is provided. The alignment device is used in a panel comprising a plurality of tubes having an inner diameter and an outer diameter. The alignment device includes a cylindrical first portion sized to fit within the tube inner diameter. A tapered second portion is provided opposite the cylindrical first portion, the tapered second end having a first end diameter that is substantially the same size as the outer diameter.

4 Claims, 2 Drawing Sheets

BOILER TUBE PANEL INSTALLATION DEVICE AND METHOD OF ALIGNING

BACKGROUND

The subject matter disclosed herein relates to boiler and boiler tube panel, and in particular to a system and method of aligning a panel of tubes to a corresponding system.

Steam generation systems in modern power plants include boilers with banks of steel (and other alloys) tubes that extend vertically and horizontally for distances frequently in excess of fifty feet Such tubes have outer diameters of up to four inches and more with wall thickness of up to about one half inch, adjacent tubes being connected together with metal membranes. These panels are frequently replaced because of wear, corrosion and fatigue. Typically, repair of such boiler tube panels has involved removal of the old tube panel by flame cutting, finishing smoothing, weld repairing and finish polishing the portholes in the drum, and then inserting and rolling in place a replacement panel of tubes— an expensive and time consuming process. In some instances, when new panels are inserted into the desired location in the drums, they require jacking and pulling with high forces to align each individual tube in the panel to its associated porthole. This misalignment is not only caused by the warpage of the old drum but is also caused by the distortions caused by the welding between tubes of the new panel. Typically the replacement of a 12 tube panel involves five service personnel and takes 20 hours to perform. It should be appreciated that often multiple panels are replaced when the boiler is taken offline for servicing.

Part of the difficulty in replacing boiler tube panels is that a panel normally consists of twelve tubes welded together. Each tube has on average only 0.020 of an inch clearance between its outside diameter and the diameter of the hole that it goes into. Because these panels are so large and are welded no two holes line up to their desired location due to movement between the welded tubes thus making it incredibly difficult and time consuming to get the entire panel inserted. To achieve the desired alignment, tube panels are inserted by lining each tube in each panel individually to its desired location in the drum section of the boiler with the use of several steel wedges along with several pulling devices (e,g, a plurality of come-along tools). This process is labor intensive, and takes a long time to complete.

Accordingly, while existing processes for installing boiler tube panels are suitable for their intended purpose, the need for improvement remains, particularly in providing an installation system and method having the features described herein.

BRIEF DESCRIPTION

According to one aspect of the disclosure an alignment device for aligning a tube panel with a plurality of pipes system is provided. The panel comprising a plurality of tubes having an inner diameter and an outer diameter. The device includes a cylindrical first portion sized to fit within the tube inner diameter. A tapered second portion is provided opposite the cylindrical first portion, the tapered second end having a first end diameter that is substantially the same size as the outer diameter.

In addition to one or more of the features described herein, or as an alternative, further embodiments of the device may include the tapered second portion having a second end opposite the first end, the second end having a semi-spherical shape. In addition to one or more of the features described herein, or as an alternative, further embodiments of the device may include a cylindrical third portion disposed between the first portion and the second portion. In addition to one or more of the features described herein, or as an alternative, further embodiments of the device may include the third portion having substantially the same diameter as the first end diameter.

In addition to one or more of the features described herein, or as an alternative, further embodiments of the device may include the first portion has a diameter tolerance of −0.000 inches to +0.002 inches. In addition to one or more of the features described herein, or as an alternative, further embodiments of the device may include the first end diameter being +/−0.002 inches. In addition to one or more of the features described herein, or as an alternative, further embodiments of the device may include the first portion having a diameter of about 1.650 inches and a length of about 2.750 inches.

In addition to one or more of the features described herein, or as an alternative, further embodiments of the device may include the second end having a radius of about 0.5 inches. In addition to one or more of the features described herein, or as an alternative, further embodiments of the device may include the first end diameter being about 1.998 inches. In addition to one or more of the features described herein, or as an alternative, further embodiments of the device may include the second portion having a length of about 1.625 inches. In addition to one or more of the features described herein, or as an alternative, further embodiments of the device may include the third portion having a length of about 0.875 inches.

According to yet another aspect of the disclosure, a method of installing a tube panel into a system having a plurality of pipes is provided. The method includes welding a plurality of tubes together to form the panel, each of the plurality of tubes having an outer diameter. An insert is placed in an end of each of the plurality of tubes, the insert having a tapered portion with a first end diameter that is substantially the same as the outer diameter. The tapered portion is aligned with the plurality of pipes. Each of the tapered portions is inserted into a corresponding of the plurality of pipes. The plurality of tubes are inserted into the plurality of pipes.

In addition to one or more of the features described herein, or as an alternative, further embodiments of the method may include removing the inserts from the plurality of tube after inserting the plurality of tubes into the plurality of pipes. In addition to one or more of the features described herein, or as an alternative, further embodiments of the method may include engaging a cable or chain attached to the end of the insert in the step of removing the inserts. In addition to one or more of the features described herein, or as an alternative, further embodiments of the method may include coupling the plurality of tubes to the plurality of pipes after inserting the plurality of tube into the plurality of pipes.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide advantages in facilitating the installation of a boiler tube panel to a boiler system. It should be appreciated that while embodiments herein refer to a boiler tube panel and a boiler mud drum, this is for example purposes and the claims should not be so limited. In other embodiments, the disclosed alignment device and method may be used in any application having at least a pair of connected tubes that are being installed into pipes that are disposed in a fixed relationship.

Figure 1:
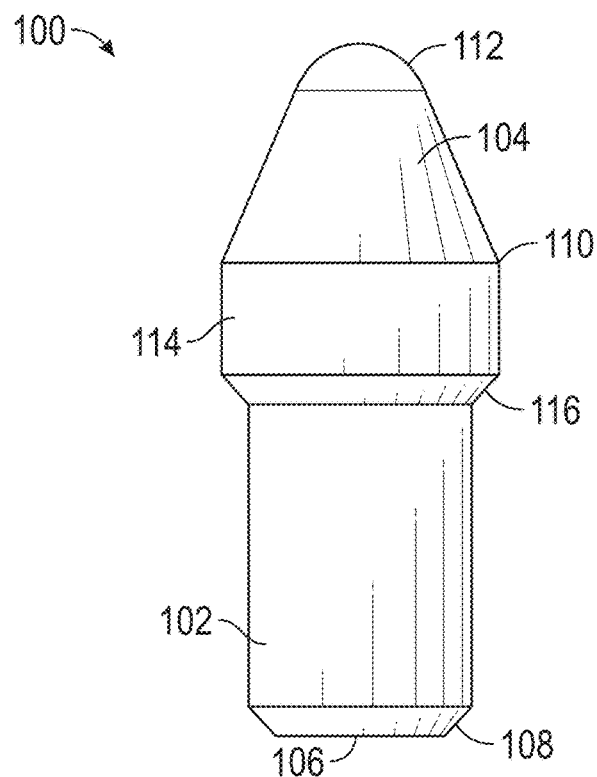
FIG. 1 is a side view of a boiler tube panel alignment device in accordance with an embodiment.

Referring to FIG. 1, an embodiment of an alignment device 100 shown that is used for aligning boiler tube panels with a corresponding set of pipes on a boiler system. The device 100 includes a cylindrical first portion 102 on one end of the device and a tapered second portion 104 on an opposite end. The first portion 102 has an outer diameter that is sized to closely fit within the inner diameter of the boiler tube. In an embodiment, the first portion has a diameter of 1.650 inches with a tolerance of +0.002 inches and −0.000 inches. In an embodiment, the end 106 may include a chamfer 108.

In an embodiment, the second portion 104 includes a first end 110 and a semi-spherical second end 112. In an embodiment, the first end 110 has a diameter that is sized to fit closely within the inner diameter of the pipes on the boiler system that the boiler tube panel is to be connected. In an embodiment, the first end has a diameter about the same as the outer diameter of the boiler tubes. In an embodiment, the first end has a diameter of 1.998 inches with a tolerance of +/−0.002 inches. In an embodiment, the second end has a radius of about 0.500 inches.

Disposed between the first portion 102 and the second portion 104 is a cylindrical third portion 114. In an embodiment, the third portion 114 has a diameter that is the same as the first end 110. In an embodiment, the third portion 114 has a diameter of 1.998 inches with a tolerance of +/−0.002 inches. In an embodiment, a chamfer 116 may be disposed between the third portion 114 and the first portion 102.

Figure 2:
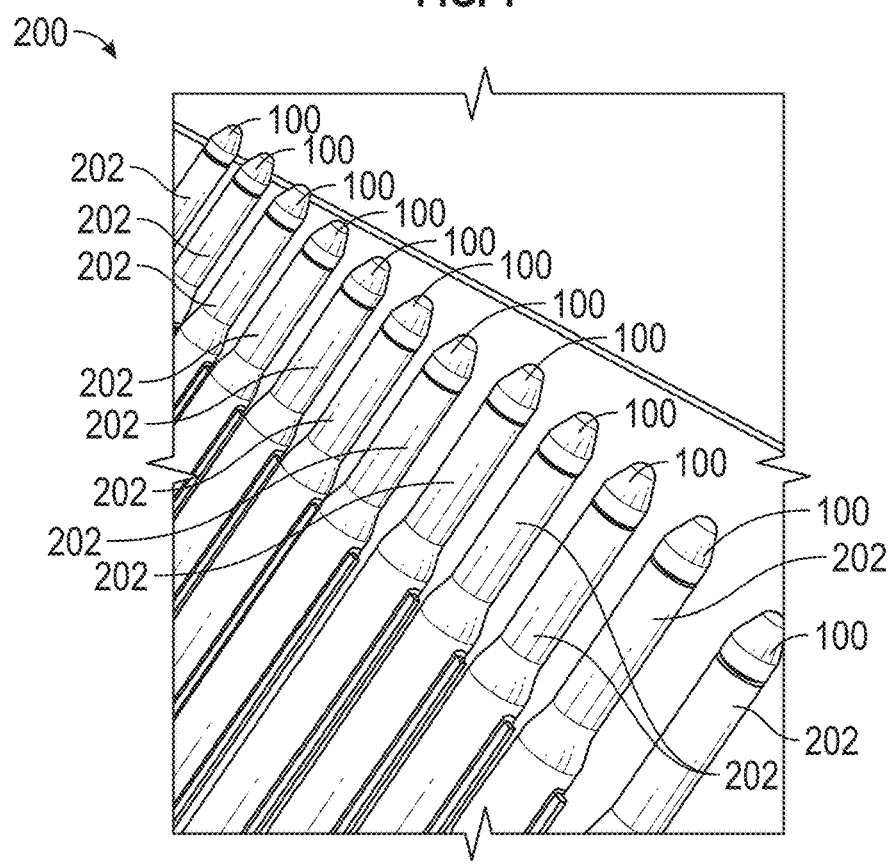
FIG. 2 is a perspective view of a boiler tube panel with the alignment device of FIG. 1 installed.

Referring to FIG. 2, a boiler tube panel 200 is shown. The boiler tube panel 200 includes a plurality of tubes 202. Typically, the individual boiler tubes 202 are coupled together by welding. In an embodiment, each of the plurality of tubes 202 includes a flange that is welded to the flange of an adjacent tube 202 to form a boiler tube panel 200. In some applications, the panel 200 has twelve boiler tubes, and the boiler system may include a plurality of panels. Typically, the boiler tube panel 200 is configured to engage and couple to a plurality of pipes on the boiler system, such as the pipes on the mud drum section of the boiler system.

As shown in FIG. 2, in preparation for installation, an alignment device 100 is inserted into the ends of the tubes 202. Typically this involves inserting the first portion 102 into the inner diameter of the tube 202 with the second portion 104 and the third portion 114 extending therefrom. In prior art installation processes, each tube 202 was manually aligned with the pipes on the mud drum. Since the clearance between the outer diameter of the tube 202 and the inner diameter of the pipe it is being inserted into is only 0.020 inches, the alignment and installation required five-rigging points and five installation personnel. The installation would use steel wedges and pulling devices (come-a-longs) to force the alignment of the individual tubes. In the prior art process it took the five installation personnel about 20 hours to install one panel.

In an embodiment, installation personnel insert the alignment tool 100 into the ends of the plurality of tubes. The tapered second portion 104 allows the engagement of the alignment device 100 to the plurality of pipes on the boiler system using only two rigging points.

Figure 3:
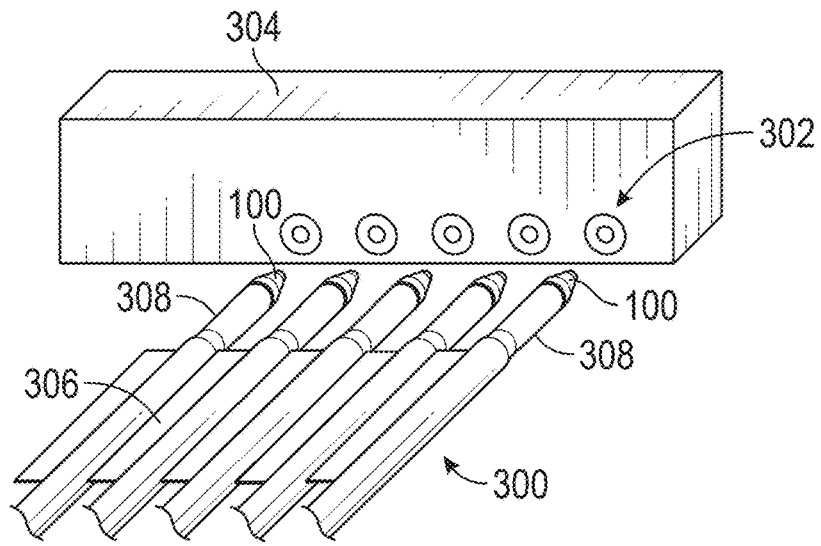
FIG. 3 is a perspective view of a boiler tube panel being installed into a boiler system.
Figure 4:
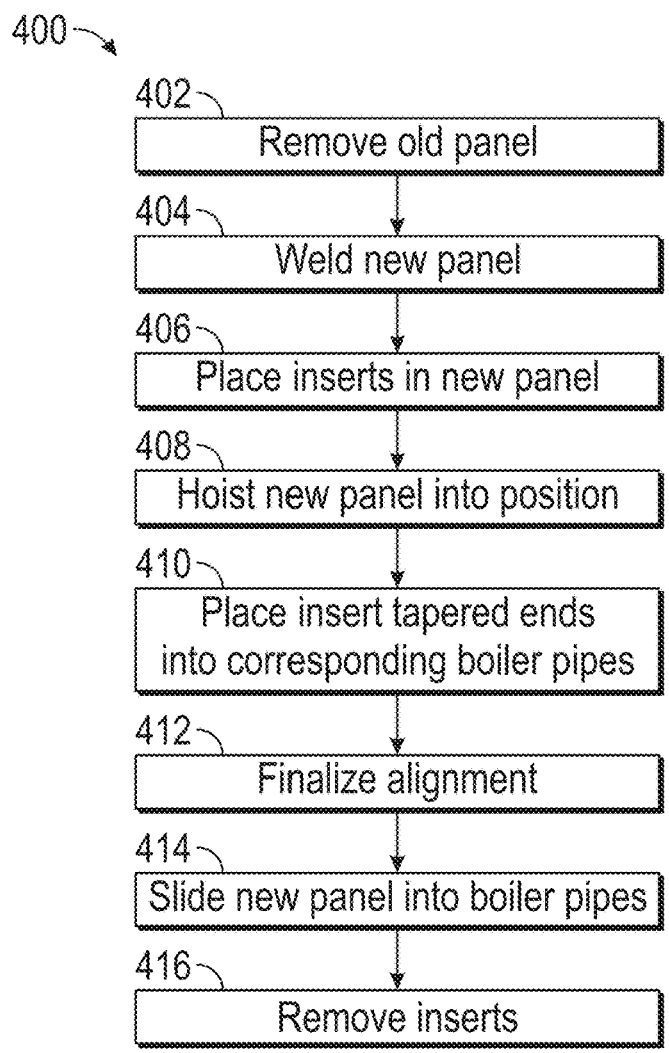
FIG. 4 is a flow diagram of a method of aligning and installing a boiler tube panel into a boiler system.

Referring now to FIG. 3 and FIG. 4, an embodiment of installing a panel of tubes into a set of pipes, such as boiler tubes 300 into pipes 302 connected to a boiler mud drum 304 for example. The method 400 starts in block 402 where the old assembly tubes, referred to as a panel such as boiler tube panel 300 for example, are removed. The method then proceeds to block 404 where the new panel of tubes 300 is coupled together, such as by welding flanges 306 for example. It should be appreciated that in some embodiments, the process of coupling of the panel of tubes may cause small deviations or distortions in the tubes. As a result, it may be very difficult to install the panel of tubes in to the plurality of pipes 302 since the distortions may cause small misalignments. To resolve this, the method 400 proceeds to block 406 where the inserts 100 are placed in the end 308 of each tube in the panel of tubes 300. The inserts 100 are placed in the ends 308 of the panel tubes 300 such that the tapered second portion extends beyond the end of the panel of tubes 300 and the chamfer 116 is in contact with the end of the tube.

The method 400 then proceeds to block 408 were the panel of tubes 300 is positioned adjacent the pipes 302 with the tapered second portions 104 facing the pipes 302. In an embodiment, the panel of tubes is raised up until the centerline of the holes in the drum and the front of the tapered second portions 104 are roughly aligned. The method 400 then proceeds to block 410 where each of the tapered second portions 104 is placed within the corresponding pipe 302. The alignment is finalized in block 412 by pushing, pulling, or drawing the panel of tubes 300 towards the pipes 302. As the tubes 300 move towards the pipes 302, the inserts 100 deflect the tubes 300 to correct for any deformations or deviations in the positions of the ends 308.

As the panel of tubes 300 moves towards the pipes 302, the ends 308 slide into the inner diameters of pipes 302 in block 414. In the embodiment where the tubes 300 are connected to the mud drum 304, the ends 308 may slide through the pipes 302 into the interior of the mud drum 304. With the panel of tubes 300 installed, the inserts 100 are removed in block 416. In some embodiments, the inserts may have a chain or cable coupled to the end 112. In these embodiments, the chain or cable is inserted into the pipes 302 prior to engaging the inserts 100 with the pipes. The chain or cable may then be used to retrieve the inserts 100 from the interior of the mud drum 304. In an embodiment, the chain or cable may have a loop on the end that can be used to engage or fish the inserts out of the interior of the mud drum if the mud drum (or its equivalent) is not accessible to service personnel.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of installing a boiler tube panel into a system, the method comprising:
    providing a boiler having a plurality of pipes extending therefrom, the plurality of pipes being connected to a mud drum;
    providing a plurality of inserts, each of the plurality of inserts having a first tapered portion with a first end diameter;
    welding a plurality of tubes together to form the panel, each of the plurality of tubes having an outer diameter;
    placing a respective one insert of the plurality of inserts in an end of each of the plurality of tubes, wherein the first end diameter is substantially the same as the outer diameter;
    aligning the each of the first tapered portions of the plurality of inserts with the plurality of pipes;
    inserting each of the first tapered portions of the plurality of inserts into at least one of the plurality of pipes;
    inserting the plurality of tubes into the plurality of pipes;
    removing the inserts from the plurality of tubes after the step of inserting the plurality of tubes into the plurality of pipes;
    wherein the step of removing the inserts includes engaging a loop on an end of a cable or chain attached to an end of the insert; and
    wherein the step of removing the inserts includes sliding the inserts through the plurality of pipes into an interior of the mud drum.

2. The method of claim 1, further comprising coupling the plurality of tubes to the plurality of pipes after the step of inserting the plurality of tubes into the plurality of pipes.

3. The method of claim 1, wherein:
    each of the insert includes a tapered second portion opposite the cylindrical first portion, the tapered second portion having a first end diameter that is substantially the same size as the outer diameter; and
    the step of inserting the inserts includes contacting the tapered second portion on each of the inserts with the end of the plurality of tubes.

4. The method of claim 1, further comprising inserting the cable or chain into the plurality of pipes before inserting the plurality of tubes into the plurality of pipes.

* * * * *